United States Patent

Kawabata et al.

(10) Patent No.: US 6,400,955 B1
(45) Date of Patent: *Jun. 4, 2002

(54) RADIO COMMUNICATION SYSTEM

(75) Inventors: Takashi Kawabata; Yuko Mikuni; Yoichi Moritani, all of Tokyo (JP)

(73) Assignee: Mitsubishi Denki Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/236,392

(22) Filed: Jan. 25, 1999

(30) Foreign Application Priority Data

Jun. 1, 1998 (JP) ............................. 10-150902
Nov. 2, 1998 (JP) ............................. 10-312113

(51) Int. Cl.$^7$ ................................. H04Q 7/20
(52) U.S. Cl. ................. 455/450; 455/452; 455/562
(58) Field of Search ................. 455/446, 449, 455/450, 452, 62, 63, 561, 562; 370/337, 339

(56) References Cited

U.S. PATENT DOCUMENTS

| 5,073,971 A | * | 12/1991 | Schaeffer | 455/33 |
| 5,185,739 A | * | 2/1993 | Spear | 370/95.3 |
| 5,850,608 A | * | 12/1998 | Faruque | 455/447 |
| 5,901,356 A | * | 5/1999 | Hudson | 455/451 |

FOREIGN PATENT DOCUMENTS

| EP | 0444841 A2 | 2/1991 |
| EP | 0720405 A2 | 7/1996 |
| GB | 229552 4 A | 11/1994 |
| JP | A 3-76439 | * 4/1991 |
| JP | 3-76439 | 4/1991 |
| JP | A 7-193857 | * 7/1995 |
| JP | 7-193857 | 7/1995 |
| JP | A 9-186643 | * 7/1997 |
| JP | 9-186643 | 7/1997 |
| WO | 9637969 A | 11/1996 |
| WO | 9741705 A | 11/1997 |

OTHER PUBLICATIONS

"Contoured Beam Antennas for Hub Stations of Local Distribution," Shinichi Nomoto et al., AP88–42, 1988.

* cited by examiner

Primary Examiner—Edward F. Urban
Assistant Examiner—Meless Zewdu

(57) ABSTRACT

In a radio communication system repeatedly using the same frequency, each base station and terminal station have directional antennas respectively, and a base station has direction-determining patterns for setting a direction of an antenna according to a timing, the adjacent base stations each using the same frequency use different direction-determining patterns from each other, and remote base stations repeatedly use the same direction-determining patterns. The direction-determining pattern has a correlation between a timing obtained by equally dividing a frame for a communication line by a number of direction-determining patterns and each antenna direction, and a communication slot is allocated based on a timing decided according to the table to a communication line with a terminal station positioned at a particular direction.

16 Claims, 16 Drawing Sheets

PATTERN TABLE FOR DIRECTION-DETERMINATION

| PERIOD OR TIMING | PATTERN 1 | PATTERN 2 | ... | PATTERN 6 |
|---|---|---|---|---|
| T1 | a1 | a2 | ... | a6 |
| T2 | a2 | a3 | ... | a1 |
| T3 | a3 | a4 | ... | a2 |
| T4 | a4 | a5 | ... | a3 |
| T5 | a5 | a6 | ... | a4 |
| T6 | a6 | a1 | ... | a5 |

(TIME→)

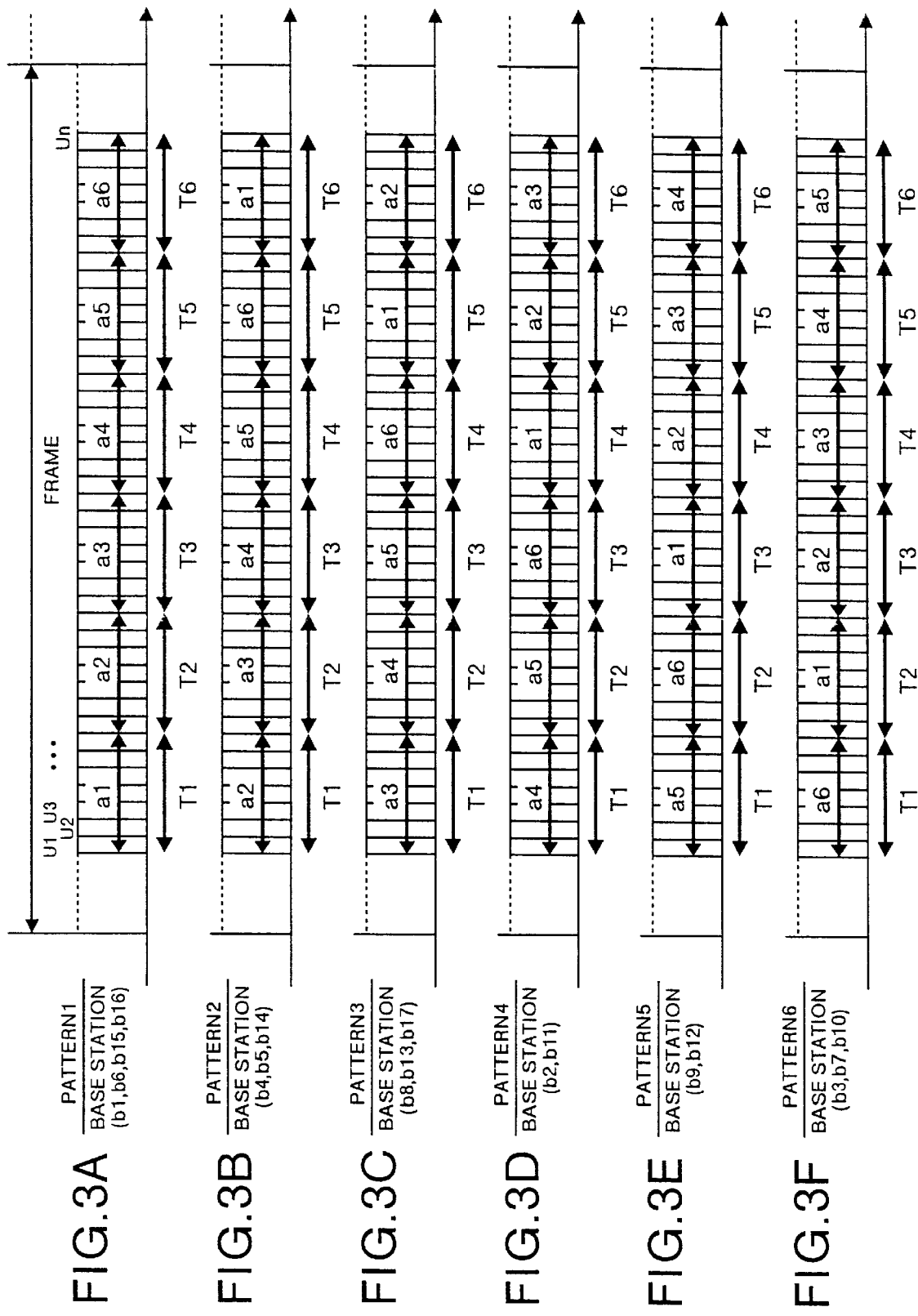

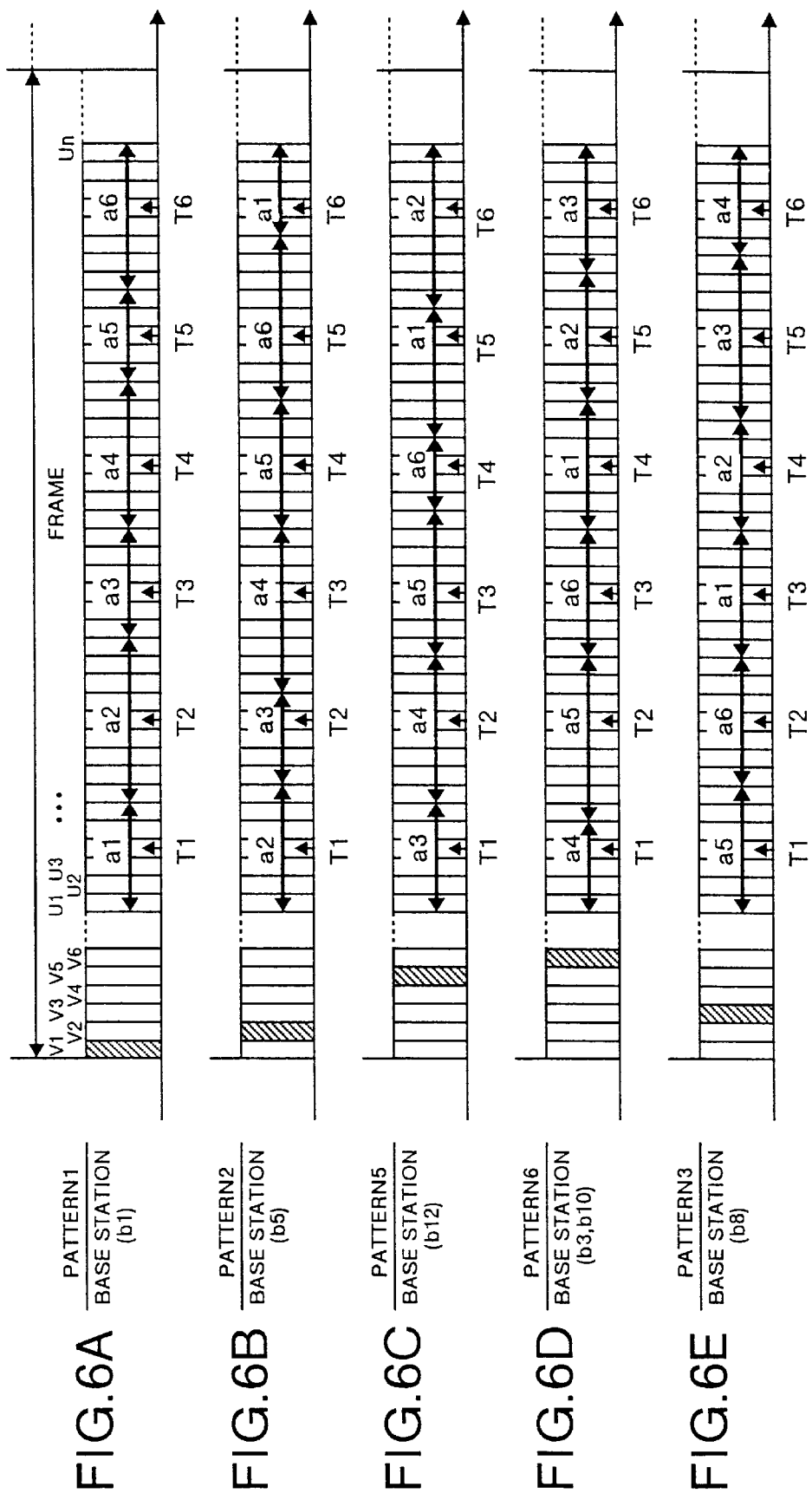

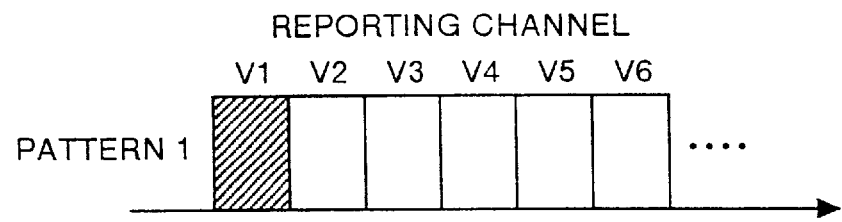
FIG.7A PATTERN 1
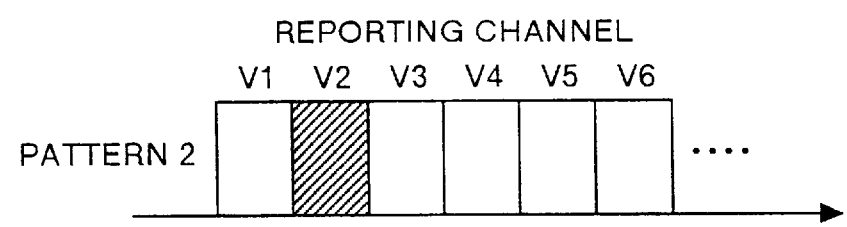
FIG.7B PATTERN 2
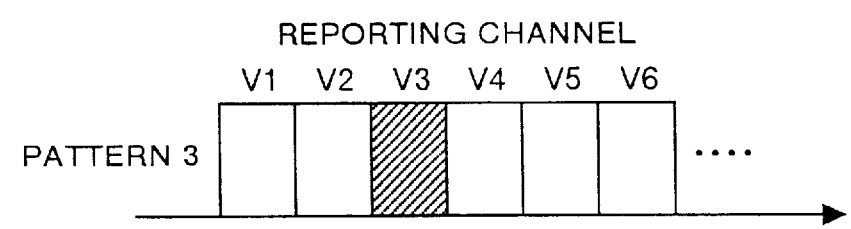
FIG.7C PATTERN 3
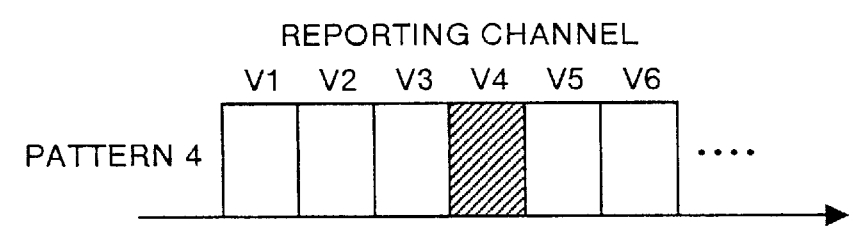
FIG.7D PATTERN 4
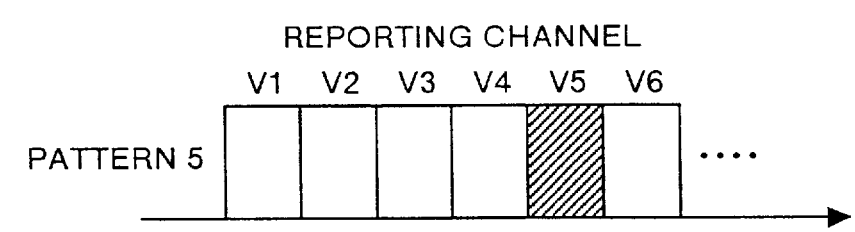
FIG.7E PATTERN 5
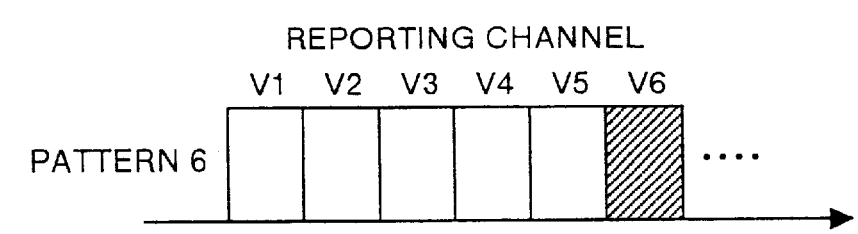
FIG.7F PATTERN 6

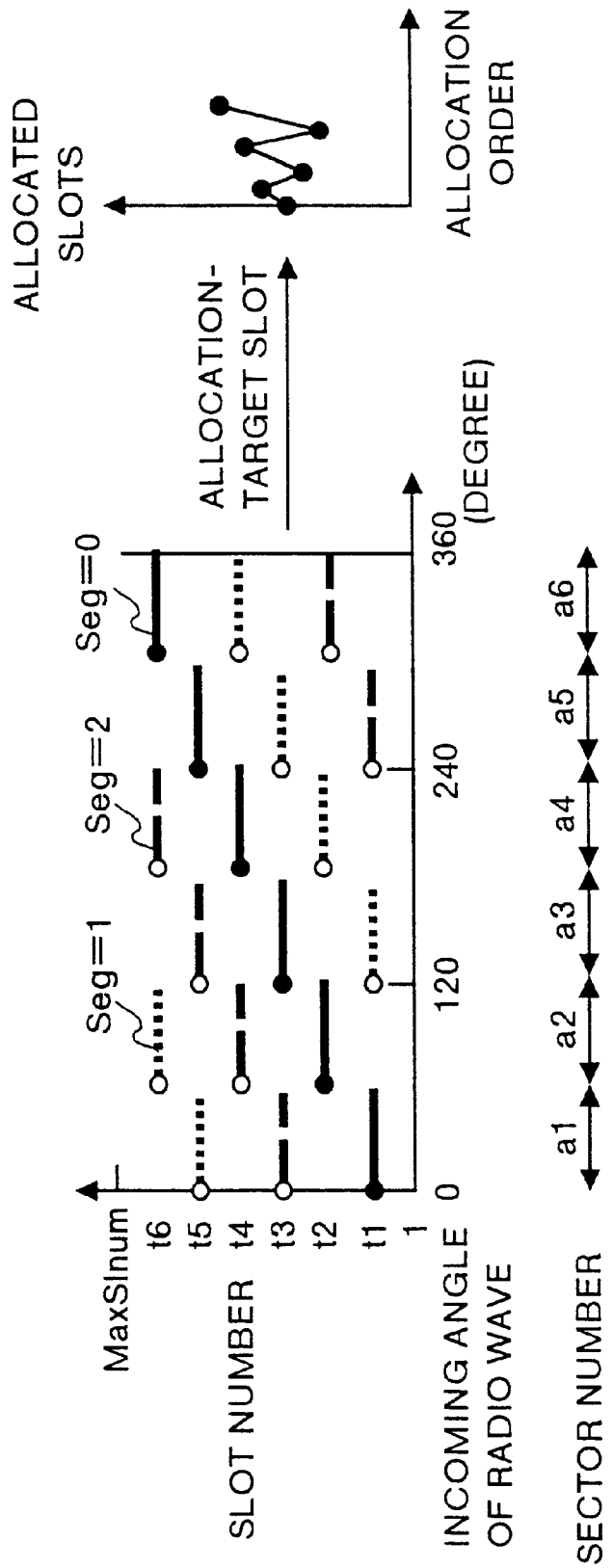

A RELATION BETWEEN
AN ALLOCATION-TARGET SLOT AND TIME

VIEW AT t1

DIRECTIVITY

VIEW AT t3

VIEW AT t5

FIG.15
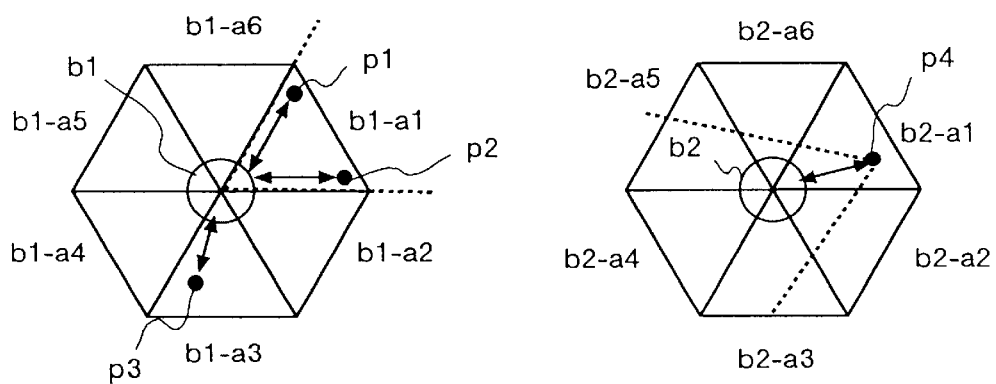
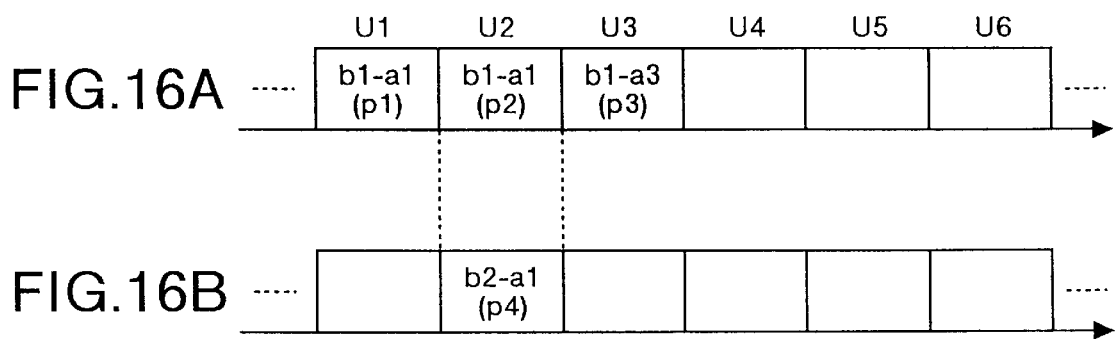
FIG.16A
FIG.16B

FIG.17
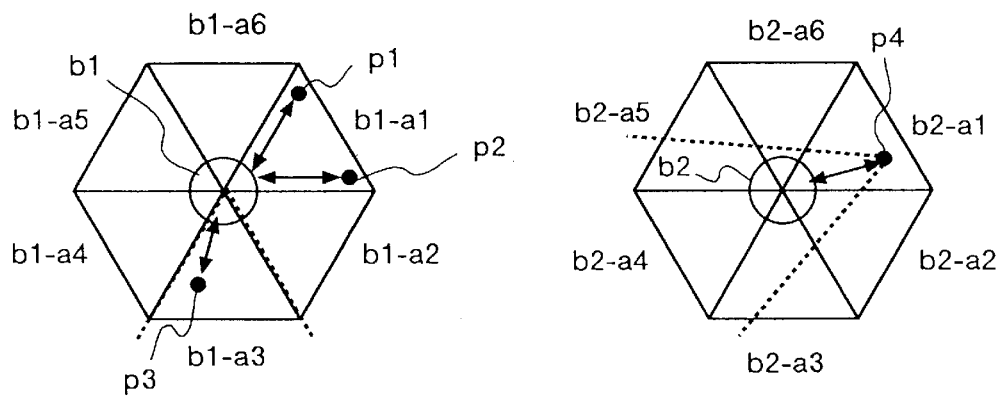
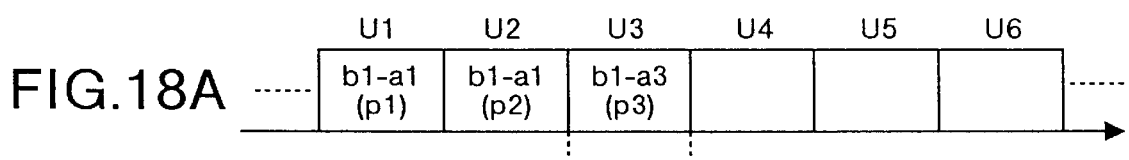
FIG.18A
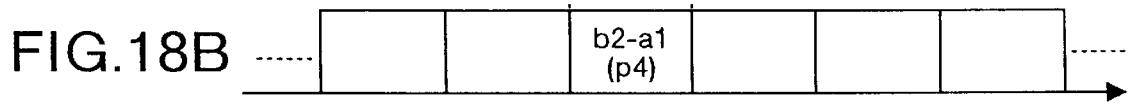
FIG.18B

RADIO COMMUNICATION SYSTEM

FIELD OF THE INVENTION

The present invention relates to a sector antenna as well as to antenna control in a radio communication system. More particularly, it is an object of the present invention to reduce the interference in the same frequency by correlating a direction of an antenna to an allocated slot position based on a TDMA system used as a multiple access system.

BACKGROUND OF THE INVENTION

FIG. 14 shows a cellular structure of a radio communication system. Numerals from b1 to b12 indicate numbers allocated to base stations, and base stations b1, b5, b7 and b12 indicate that the base stations use radio waves at the same frequency. In cellular radio communications, a method is generally employed in which a geographic frequency is reused by repeatedly using the frequency in radio zones provided at a specified distance apart from each other so that utilization efficiency of a frequency can be improved. The zones (or cells, or base station areas) which use the same frequency are geographically so located that the interference in the same frequency does not cross an allowable level. A relation between the distance R and transmission loss in free space L (R) is expressed by the equation described below (Basics of Mobile Communications: edited by IEICE).

$$L(R)=10 \log(4\pi R/\lambda)^2 \qquad (1)$$

Wherein, assuming that a carrier frequency is 5 GHz, L (R) is as follows:

$$L(R)=46.4+20 \log(R) \qquad (2)$$

Namely, a channel having the radio wave attenuation property as shown in the equation (2) is reused at an allowable interference level. Therefore, when high-speed radio communications are to be realized in cellular radio communications, it is important to consider the problem of sending power as well as the problem of reduction of the interference in the same frequency channel.

Especially, when data transfer and radio packet transfer are to be realized with cellular mobile communications, the interference in the same frequency channel has to be reduced. That is because, when data transfer is to be performed, higher line quality is required as compared to that for speech data. For example, in a PHS system which is actually used, it is required that an error rate to speech data transfer is 1.0E−3 or less, but an error rate lesser than this is required for data transfer. Namely, the fact described above indicates that, when the sending power is constant, a ratio of power of the desired to undesired waves is required to be made larger in the cellular radio communications, which prevents improvement in the utilization efficiency of a frequency. In addition, when high-speed data transfer is to be performed, a problem such as selective fading due to multiple scattered waves noticeably comes up, so that it is difficult to insure desired line quality.

For overcoming those problems, a cellular radio communication system using a directional antenna is known. It is known that, the directional antenna can make a delay spread smaller. Communications between a base station and a terminal station, what is called point to point communications are executed with a beam antenna by narrowing down the directivity of an antenna. Therefore, when a beam is ideally provided between two points, interference to other lines may not exist in theory, so that it is possible to execute multiple communications by dividing space even if the same sign is used at the same frequency as well as at the same time.

FIG. 15 is a view showing directions in a radio communication system having a directional antenna. In FIG. 15, the reference numerals b1 and b2 indicate base stations which use the same frequency respectively. A sector antenna having horizontal directivity of 60 degree is located in each of the base stations, and the antenna of the base station b1 covers sector cells (b1-a1, b1-a2, b1-a3, b1-a4, b1-a5 and b1-a6), while the base station b2 covers sector cells (b2-a1, b2-a2, b2-a3, b2-a4, b2-a5 and b2-a6). Terminal stations p1 and p2 are present in the sector cell b1-a1, a terminal station p3 is present in the sector cell b1-a3, and a terminal station p4 is present in the sector cell b2-a1, each of those terminal stations has a sector antenna having horizontal directivity of 60 degree, and communicates with the base station by using each antenna of the sector cells respectively.

FIG. 16A and FIG. 16B show each slot structure of frames in the base stations b1 and b2 respectively, in which the reference numerals U1 to U6 show slots for the communication line.

FIG. 16A shows how slots are allocated in the base station b1, and shows a situation in which the slot U1 is a slot allocated thereto for communications with the terminal station p1 positioned in the sector cell b1-a1, the slot U2 is a slot allocated thereto for communications with the terminal station p2 positioned in the sector cell b1-a1, and the slot U3 is a slot allocated thereto for communications with the terminal station p3 positioned in the sector cell b1-a3.

FIG. 16B shows how slots are allocated in the base station b2, and shows a situation in which the slot U2 is a slot allocated thereto for communications with the terminal station p4 positioned in the sector cell b2-a1.

If slots in a frame are randomly allocated, as shown in the slot U2 in FIG. 16A and FIG. 16B, there may occur a case where some of the sector cells oriented in the same direction of b1-a1 and b2-a1 are used at the same timing.

FIG. 15 shows the case where sector cells orient in the same direction at the same timing like the slot U2. Each directional area of the terminal station p4 and the base station b1 are shown by a dotted line. There are included not only the base station b2 but also the base station b1 within the directional area of the terminal station p4, and there is included the terminal station p4 within the directional area of the base station b1. Therefore, the terminal station p4 easily receives radio waves not only from the base station b2 which is a desired base station but also from the base station b1 which is an interference station and shows a state in which the interference becomes larger.

As a method of avoiding such a situation, there is known a method of changing the allocated slot when the interference is large. FIG. 18A and FIG. 18B, similarly to FIG. 16A and FIG. 16B, showing a state of how slots are allocated in each of the base stations b1 and b2. It is possible to avoid the antennas from orienting the same direction at the same timing by changing the allocated slot for the terminal station p4 to the slot U3.

FIG. 17 shows directions of the radio communication system in the slot U3 used by the terminal station p4. Each directional area of the terminal station p4 and the base station b1 are shown by a dotted line. As the terminal station p4 is not present within the directional area of the base station b1, interference does not occur.

As some other method to avoid such a problem, consideration has been made for channel allocation, and there has been proposed, in Japanese Patent Laid-Open Publication No. HEI 7-193857, a method of computing, when one terminal station generates a request for communications, directions which interference waves from all the channels may come from as well as a direction which a wave from the terminal station comes from, selecting one channel among channels in the order that the difference between the direction from which each interference wave comes and the direction from which the desired wave comes is closer to 180 degree, and allocating any channel first satisfying the conditions for allocation because large interference may occur if sector cells in the same direction give the same channel to terminal stations.

There is also a method of using the directivity within the perpendicular plane of an antenna as a method of suppressing the same frequency interference derived from repetition of the frequency.

FIG. 19 is a view showing directivity within the perpendicular plane of an antenna having a directional pattern correlated to each form of a service area described in a reference ("Beam antenna formed for a terminal system wideband radio station" by Nomoto, Watanabe in Shingaku Giho AP88-42, 1988).

In order to reduce interference due to overreach of a frequency to other base station areas using the same frequency, a gain close to an elevation angle of zero degree drops abruptly. However, a very large antenna aperture is required to form the beam as shown in the figure, which gives rise to the problems of, for example, cost and mountability of the antenna.

FIG. 20A and FIG. 20B show a relation between interference distance, height of an antenna, and required attenuation angle. Herein, it is assumed that a term "overreach" indicates a phenomenon in which interference waves reach a base station from a remote base station using the same frequency, and that a distance at which the overreach happens is called as "interference distance" and a difference between the elevation angle of an antenna for which waves will be within the base station area and an elevation angle thereof with which waves will reach a base station area existing within an interference distance is called as "required attenuation angle". FIG. 20A shows a relation between the interference distance and the required attenuation angle assuming that the height of the antenna in the base station is constant. In the figure, as compared to a required attenuation angle $\phi$ when an interference distance is D, a required attenuation angle $\phi$ 'when the interference distance is longer indicated by D' may be larger, which allows design of an antenna to be easier. FIG. 20B shows a relation between the interference distance and the height of an antenna in the base station assuming that the required attenuation angle is constant. In the figure, as compared to an antenna height h when an interference distance is D, the antenna height h' when the interference distance is longer indicated by D' may be lower, which allows better mountability of an antenna.

The mobile communication system using the conventional type of directional antenna requires observation of interference which may come from adjacent base stations to determine a timing of a slot for activating a directional antenna, which takes a long time and also makes the controls complicated.

In order to avoid interference from a remote base station using the same frequency by using directivity within the perpendicular plane of an antenna, a large antenna aperture as well as a certain height required for mounting a high antenna is needed, which gives rise to problems of, for example, cost and mountability of the antenna.

SUMMARY OF THE INVENTION

In a radio communication system according to the present invention, a plurality of direction-determining patterns have been prepared, a base station selects a first direction-determining pattern among the plurality of direction-determining patterns, each base station adjacent to the base station selects a direction-determining pattern different from the first direction-determining pattern, and each remote base station repeatedly uses the first direction-determining pattern, so that adjacent base stations avoid using the same antenna direction at the same time.

In a radio communication system according to the present invention, each of the direction-determining patterns has a correlation between a period obtained by equally dividing a frame for a communication line by a number of direction-determining patterns and each antenna direction, and a base station has a means for selecting one among the direction-determining patterns as well as a means for determining an antenna direction used for communications with a terminal station and allocates a communication slot used for communications with a terminal station determined as one using a particular antenna direction from slots included in the period correlated by the direction-determining pattern.

In a radio communication system according to the present invention, each of the direction-determining patterns has a correlation between a timing obtained by equally dividing a frame for a communication line by a number of direction-determining patterns and each antenna direction, and a base station has a means for selecting one among the direction-determining patterns as well as a means for determining an antenna direction used for communications with a terminal station and allocates a communication slot used for communications with a terminal station determined as one using a particular antenna direction from slots each having a timing adjacent to the timing correlated by the direction-determining pattern.

In a radio communication system according to the present invention, the base stations has a plurality of broadcasting channels each for broadcasting common information to a terminal station and selects a broadcasting channel different from those of adjacent base stations so that interference from adjacent base stations to the broadcasting channel of the base station can be avoided, and by setting a number of broadcasting channels to be the same as the number of direction-determining patterns, the base station selects one among the direction-determining patterns correlated to the selected broadcasting channel.

In a radio communication system according to the present invention with a directional antenna provided in each base station as well as with a means for setting a direction of the antenna for each communication slot and for repeatedly using radio waves at the same frequency, a number of directivity segregation is set to an integer more than 2, and a base station has a means for selecting a directivity segregation number as a natural number smaller than the number of directivity segregation, each of base stations adjacent to the base station has a means for selecting a directivity segregation number different from the first directivity segregation number, and each of remote base stations can repeatedly select the first directivity segregation number; and for the purpose of allocating a communication slot to a terminal station, a base station has a means for obtaining sector numbers as natural numbers into which an angle of a radio wave to a terminal station is classified; a means for obtaining, by combining the sector number with the directivity segregation number of the base station, allocation-target slots different from each other; and a means for allocating slots to terminal stations around each of the allocation-target slots.

In a radio communication system according to the present invention with a directional antenna provided in each base station and a means for setting a direction of the antenna for each communication slot and for repeatedly using radio waves at the same frequency, a number of directivity segregation is set to an integer more than 2, and the base station has a means for selecting a directivity segregation number as a natural number smaller than the number of directivity segregation, each of base stations adjacent to the base station has a means for selecting a directivity segregation number different from the first directivity segregation number, and each of remote base stations can repeatedly select the first directivity segregation number; and for the purpose of allocating a communication slot to a terminal station, a base station has a means for obtaining allocation-target slots different from each other by combining an angle of a radio wave to a terminal station with a directivity segregation number of the base station; and a means for allocating slots to terminal stations around each of the allocation-target slots.

In a radio communication system according to the present invention, the base station has a plurality of broadcasting channels for broadcasting common information to terminal stations, and the base station avoids, by selecting a broadcasting channel different from those of adjacent base stations, interference from the adjacent base stations to the broadcasting channel of the base station, and by setting a number of broadcasting channels to be the same as the number of directivity segregation, the base station selects the directivity segregation number correlated to the selected broadcasting channel.

Other objects and features of this invention will become apparent from the following description with reference to the accompanying drawings.

BRIEF DESCRIPTION OF THE DRAWINGS

FIG. 3A to FIG. 3F show a frame structure using direction-determining patterns according to Embodiment 1.

FIG. 6A to FIG. 6E show a frame structure using broadcasting channels according to Embodiment 3.

FIG. 7A to FIG. 7F show a structure of broadcasting channels according to Embodiment 3.

FIG. 9A and FIG. 9B are views showing a method of selecting slots to be allocated according to Embodiment 4.

FIG. 15 is a view showing directions of the radio communication system with the conventional type of directional antenna provided therein.

FIG. 16A and FIG. 16B show a slot structure of a frame in the base stations based on the conventional technology.

FIG. 17 is a view showing directions of the radio communication system in slots used by terminal stations.

FIG. 18A and FIG. 18B show a slot structure of a frame in the conventional type of base station.

DESCRIPTION OF THE PREFERRED EMBODIMENTS

Detailed description is made hereinafter for preferred embodiments of the radio communication system according to the present invention with reference to drawings.

Figure 1:
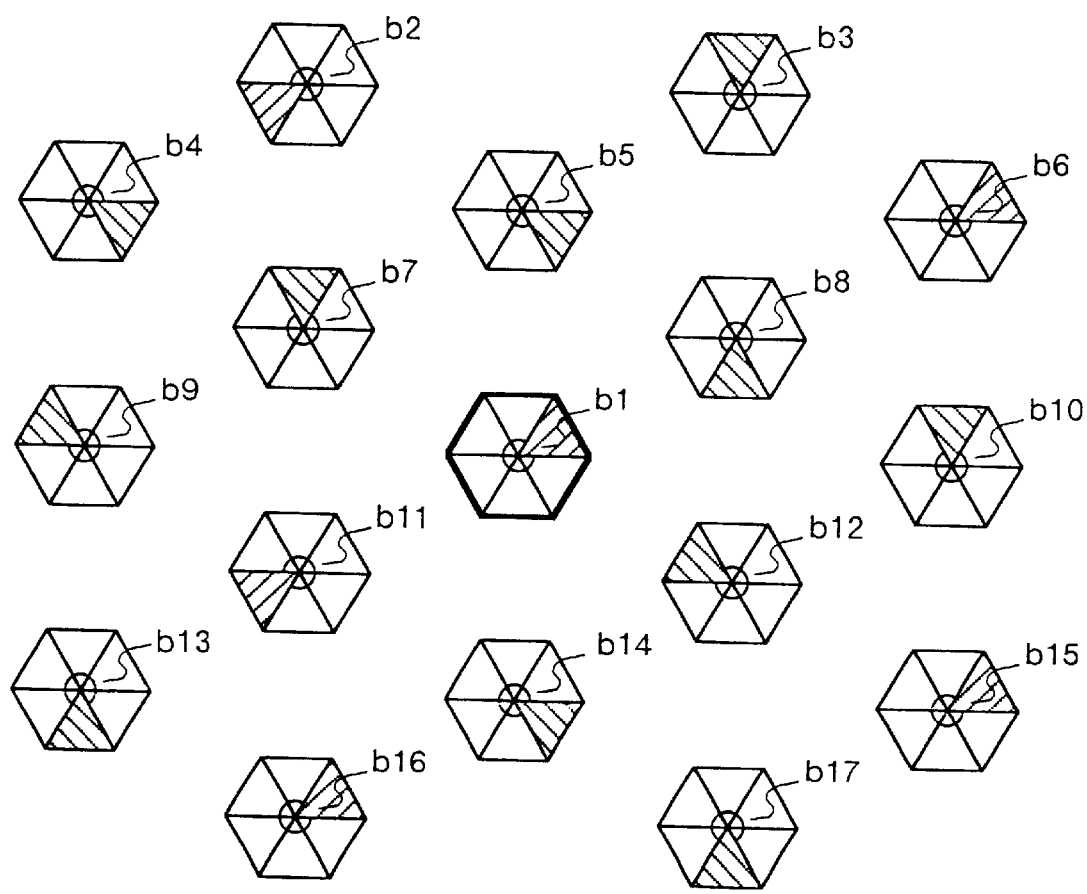
FIG. 1 shows a cellular structure using a directional antenna according to the present invention.

FIG. 1 is a radio communication system according to the embodiment of the present invention. In the figure, the reference numerals b1 to b17 represent base stations each using the same frequency, frame timings for the base stations are synchronized to each other, and each of the base stations provides therein a directional antenna (sector antenna) having fan-shaped horizontal directivity and covers a zone around the base station with a plurality of sector antennas (six units herein).

FIG. 1 shows a status of antennas each for a certain period or at a certain timing, each shaded section shows a direction of an antenna in each of the base stations for the period or at the timing, and direction of each antenna is controlled so that each antenna can avoid interference from the adjacent cells.

Figures 2A, 2B:
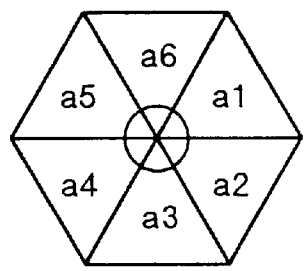
FIG. 2 shows a direction-determining pattern table according to Embodiment 1.

FIG. 2A shows directions of the antennas with signs (a1, a2, a3, a4, a5 and a6). FIG. 2B shows direction-determining patterns used for allocating each communication line with a terminal station thereto.

Each of the plurality of direction-determining patterns has a correlation between a period or a timing (T1, T2, T3, T4, T5 and T6) and a direction of each antenna (a1, a2, a3, a4, a5 and a6). For example, the pattern 1 correlates each period or timing of T1, T2, T3, T4, T5 and T6 to each of antenna directions a1, a2, a3, a4, a5 and a6 respectively. It should be noted that, a number of direction-determining patterns is equal to a maximum of a number of antenna directions, so that directions between different direction-determining patterns are set so that the antennas are not oriented to the same direction for the same period or at the same timing.

Each terminal station also has a directional antenna, and can receive a radio wave from a direction where a desired base station is located.

In addition, each base station can determine a direction of each antenna to be used for communications with a terminal station by observing a direction from which a radio wave from the terminal station comes.

FIG. 3A to FIG. 3F show each slot structure of frames for base stations respectively. For example, FIG. 3A shows a case of the base stations b1, b6, b15 and b16 each with the pattern 1 applied thereto, and a slot to be used for communications is allocated, when a terminal station is located in the direction of a1, from slots included in the period of T1.

Similarly, a slot for each of timing T2 to T6 is allocated to each terminal station located in any of the directions a2 to a6. FIG. 3B to FIG. 3F also show each slot structure of base stations each using one of the other patterns.

The base stations b5, b7, b8, b11, b12 and b14 each adjacent to the base station b1 using the pattern 1 use patterns other than the pattern 1, which makes the patterns different from each other among the adjacent base stations, but the base stations b6, b15 and b16 remote to the base station b1 repeatedly use the same pattern as that of the base station b1. By controlling the patterns so as to be different from each other as described above, degradation of communications due to interference can be suppressed.

Figure 4A:
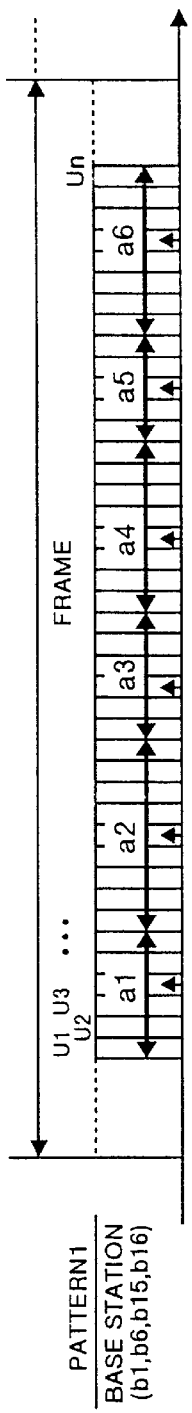
FIG. 4A to FIG. 4F show a frame structure using direction-determining patterns according to Embodiment 2.
Figure 4B:
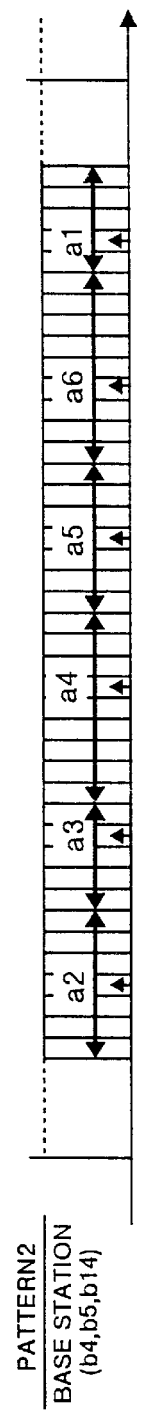
Figure 4C:
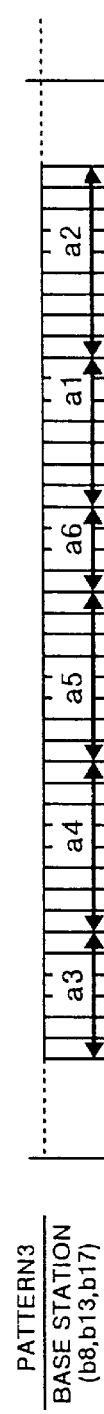
Figure 4D:
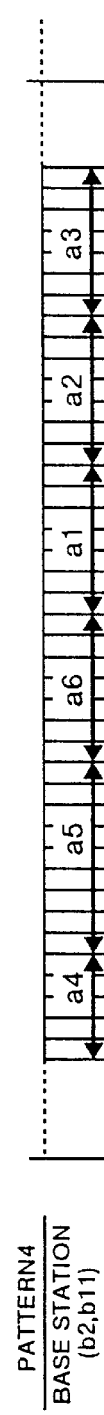
Figure 4E:
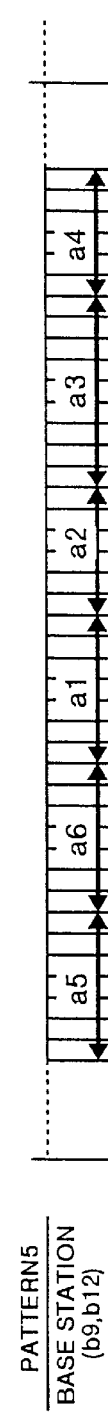
Figure 4F:
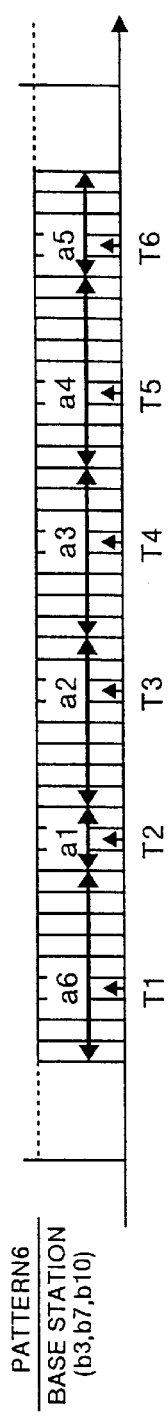

Description in Embodiment 1 has assumed the periods or timing T1 to T6 as periods each having a specified time width, but a timing indicating a time within a frame may be used for the periods or timing. FIG. 4A to FIG. 4F show each slot structure of frames for base stations respectively. For example, FIG. 4A shows a case of the base stations b1, b6, b15 and b16 each with the pattern 1 applied thereto, and a slot is allocated, when a terminal station is located in the direction of a1, from slots each having a timing closer to the timing of T1. Similarly, slots are allocated in the order of being closer to the timing T2 to T6 to terminal stations located in any of the antenna directions a2 to a6. FIG. 4B to FIG. 4F also show each slot structure of base stations each using one of the other patterns.

In this embodiment, a slot is allocated based on the timing (T1 to T6), so that a number of slots to be allocated to each antenna direction is variable depending on a calling rate in each direction. When the traffic gets concentrated in a certain antenna direction, many slots using the antenna direction are allocated, which allows calling loss to be reduced.

This case is conceivable to a case where adjacent base stations use the same direction at the same timing. In that case, when large interference occurs between slots like that based on the conventional technology, the slot to be allocated is changed.

Each of the direction-determining patterns used in each base station has been fixedly allocated in Embodiment 1 or Embodiment 2, but a pattern to be used may be decided by observing interference to a broadcasting channel.

Figure 5:
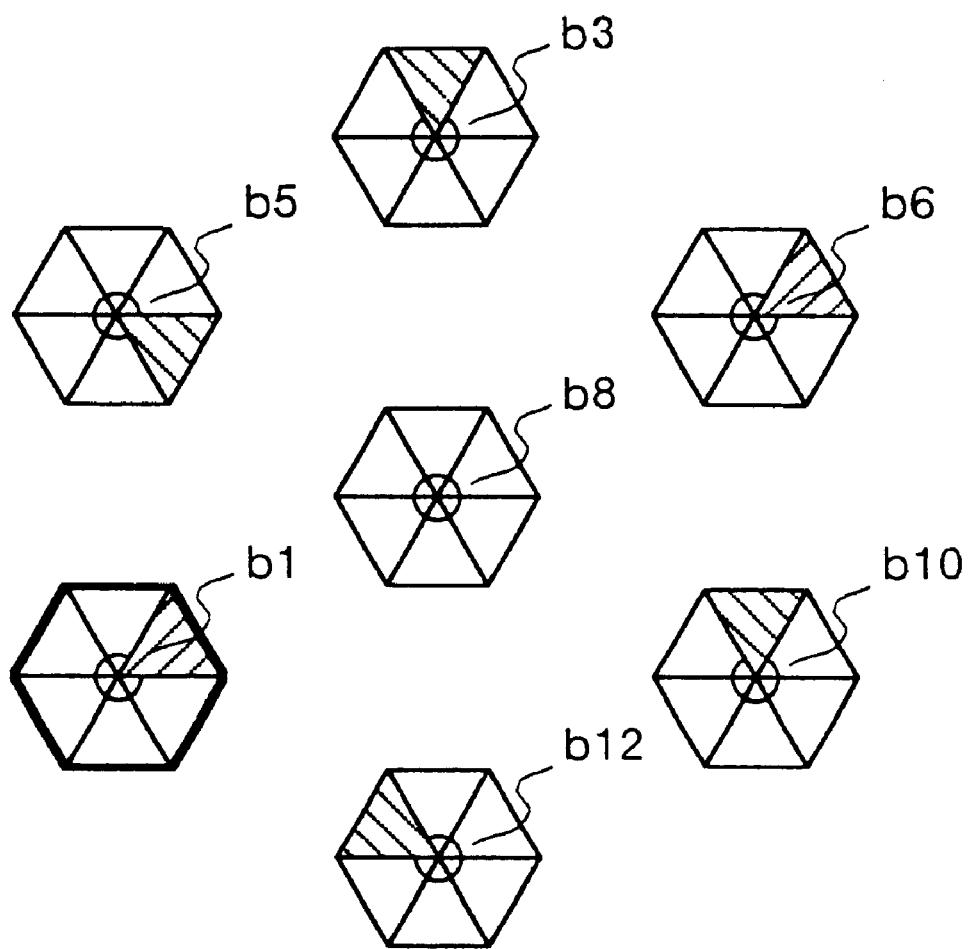
FIG. 5 shows a cellular structure according to Embodiment 3.

FIG. 5 shows a cellular structure. In FIG. 5, the reference numerals b1, b3, b5, b6, b8, b10 and b12 indicate base stations, each of which has a directional antenna using a radio wave at the same frequency and having directivity of six directions. FIG. 5 also shows a status of a certain timing, and each shaded section shows a direction of each cell at the timing respectively.

FIG. 6A to FIG. 6E show is frame structures each using a broadcasting channel (V ch). Each of the broadcasting channels is provided in front of slots (U1, U2, . . . , Un) of each communication line in FIG. 6A to FIG. 6E. Each of the base stations transmits common information such as system information and signals to the base station used for synchronous capture of terminal stations by using one of the slots V1 to V6 of the broadcasting channels. FIG. 6A shows a frame structure when the base station b1 in FIG. 5 uses V1 as a broadcasting channel slot and also uses the pattern 1 as a direction-determining pattern. Similarly, FIG. 6B, FIG. 6C, and FIG. 6D show each frame structure for other base stations b3, b5, b10 and b12 each using a different pattern respectively. FIG. 7A to FIG. 7F explain segregation between broadcasting channels and patterns. A number of slots in each broadcasting channel is set to the same number of direction-determining patterns. Herein, there is shown an example in which each base station using broadcasting channels V1 to V6 uses one of the direction-determining patterns 1 to 6.

Herein, there is assumed a case where the base stations other than the base station b8 are operating in FIG. 5 and the base station b8 is established anew and its service is started. At first, the base station b8 selects, by observing each slot of broadcasting channels, a broadcasting channel receiving less interference. As shown in FIG. 6A to FIG. 6D, the slots V1, V2, V5 and V6 are under use, so that it is observed that the base station b8 may receive large interference from the slots V1, V2, V5 and V6. The base station b8 selects, for example, V3 as a slot for the broadcasting channel receiving less interference. As described above, segregation of broadcasting channels can be realized among base stations by selecting a broadcasting channel receiving less interference.

Then, a direction-determining pattern is selected by using a result of segregation of broadcasting channels. FIG. 6E is a frame structure of the base station b8 when the base station b8 having selected the slot V3 of the broadcasting channels selects the corresponding direction-determining pattern 3. The base station b8 uses the direction-determining pattern different from patterns in the other peripheral base stations (b1, b3, b5, b6, b10 and b12) each using the same frequency, so that it is avoided to use the same direction at the same timing. As described above, a direction-determining pattern used for allocating a slot of a communication line can be selected according to segregation of the broadcasting channels, so that the need for previous allocation of a direction-determining pattern to each base station is eliminated.

It should be noted that the description in the embodiment has assumed a case where an up line and a down line are separated, but the present invention is applicable also to a case where the lines are not separated.

The description has also assumed a case where there are six sector cells, but it does not matter whatever a number of sectors may be.

Figure 8:
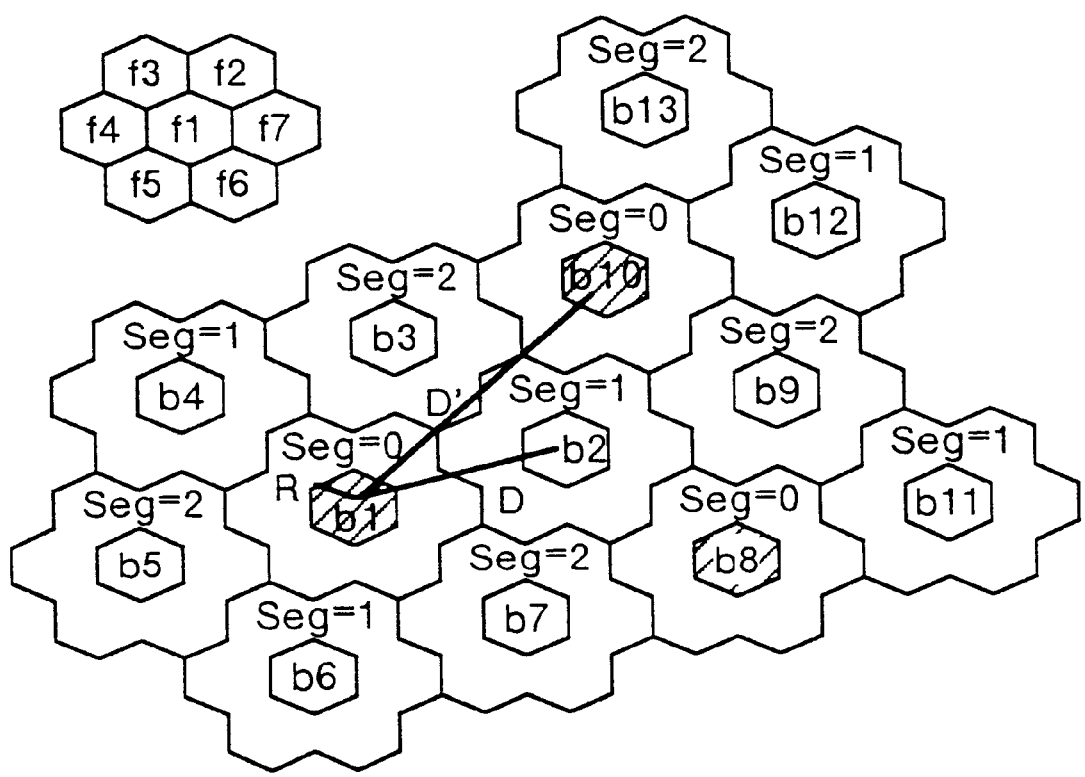
FIG. 8 is a view showing a state of directivity segregation in base stations according to Embodiment 4.

FIG. 8 is a view showing a state of directivity segregation in base stations according to Embodiment 4. It is assumed that frames in all the base stations synchronize to each other. This figure shows a case where area services are performed by using a number of repetition frequencies of N=7, namely seven frequencies of f1 to f7. In the figure, hexagons b1 to b13 show an area of base stations using the same frequency f1. Each number indicated by Seg in the figure shows a directivity segregation number. The figure assumes a case where a number of directivity segregation is 3, and each base station has a means for selecting any of 0, 1, or 2 as a directivity segregation number. Each of the adjacent base stations using the same frequency can select a different directivity segregation number, while each of the remote base stations can repeatedly select the same directivity segregation number as that of the base station.

FIG. 9A to FIG. 9B show a method of selecting slots to be allocated according to Embodiment 4. FIG. 9A in the left side shows a method of obtaining an allocation-target slot from incoming angles of radio waves, and FIG. 9B in the right side shows a method of allocating slots around the allocation-target slot.

The horizontal axis of FIG. 9A shows incoming angles of radio waves, and each sector number (a1 to a6) can be obtained by classifying the angles. For example, incoming radio waves are observed by using sector antennas orienting six different directions and any antenna number with the highest received electric field level may be selected as a sector number.

Herein, the incoming angle of a radio wave is an angle for an up line from a terminal station to a base station, which has a relation, in the opposite direction by 180 degrees, with an angle of a radiation radio wave for a down line from the base station to the terminal station. Therefore, allocation of slots for the up line and down line can be performed in the same manner by transforming the angle of a radiation radio wave to the opposite direction by 180 degrees.

The vertical axis of FIG. 9A shows slot numbers, and it is assumed that slots in a frame are arranged in order from slot No. 1 to slot No. MaxSlnum. In FIG. 9A, the solid line indicates base stations with the directivity segregation number of 0, the dotted line indicates base stations with the directivity segregation number of 1, and the dashed line indicates base stations with the directivity segregation number of 2, which correlates a combination between a sector number and a directivity segregation number to an allocation-target slot. Namely, if a sector number and a segregation number are decided, an allocation-target slot can uniquely be decided. It should be noted that this correlation is decided so that a segregation number and a sector number are correlated to target slots different from each other.

Figure 10A:
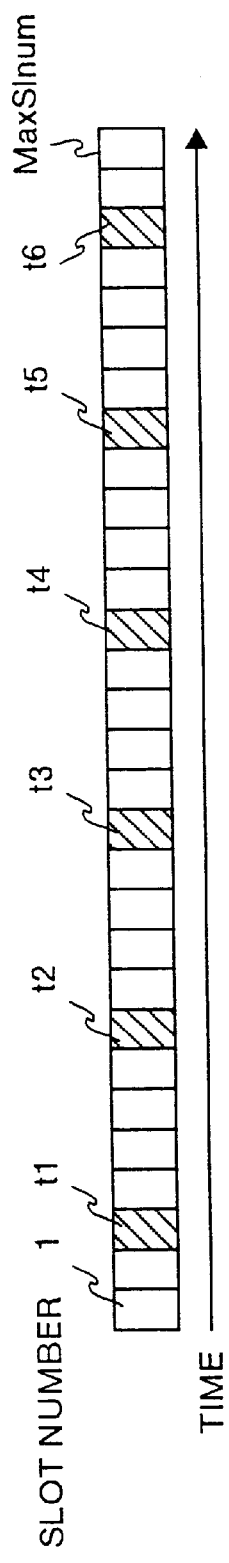
FIG. 10A to FIG. 10D are views for explaining correlation among sector numbers, segregation numbers, and slot numbers.

Further, description is made for correlation of a sector number as well as a segregation number to a slot number with reference to FIG. 10A to FIG. 10D. FIG. 10A shows a communication line in one frame. The communication line consists of slots from slot number 1 to slot number MaxSlnum.

The hatch slots in the figure correspond to allocation-target slots (t1 to t6) selected by the processing in FIG. 9A.

Figure 10B:
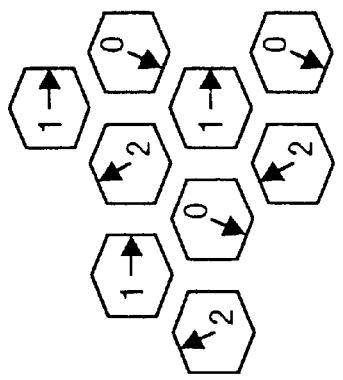
Figure 10C:
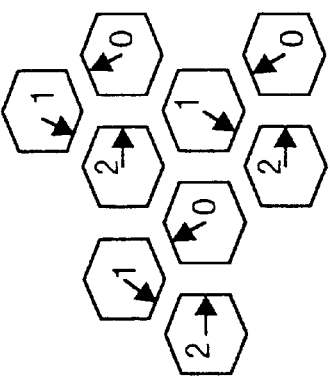
Figure 10D:
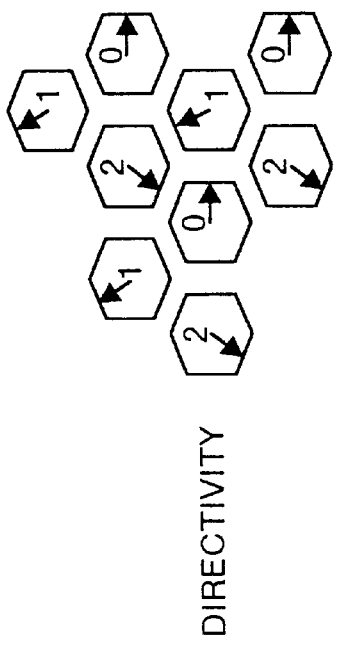

FIG. 10B, FIG. 10C, FIG. 10D show each direction of base stations in each time corresponding to the slots t1, t3 and t5 respectively. A group of hexagons is an area for base stations using the same frequency, and a numeral in each hexagon shows a segregation number and an arrow therein shows a direction. For example, when viewing FIG. 10B, a base station with a segregation number Seg=0 orients a direction of 0 degree, a base station with a segregation number Seg=1 orients a direction of 120 degrees, and a base station with a segregation number Seg=2 orients a direction of 240 degrees. Those angles correspond to incoming angles of radio waves correlated to the slot t1 in FIG. 9A such that Seg is 0 when the angle is 0 degree, Seg is 1 when the angle is 120 degrees, and Seg is 2 when the angle is 240 degrees. Similarly, it is clear that FIG. 10C and FIG. 10D also correspond to the slots t3 and t5 in FIG. 9A respectively.

Figure 11:
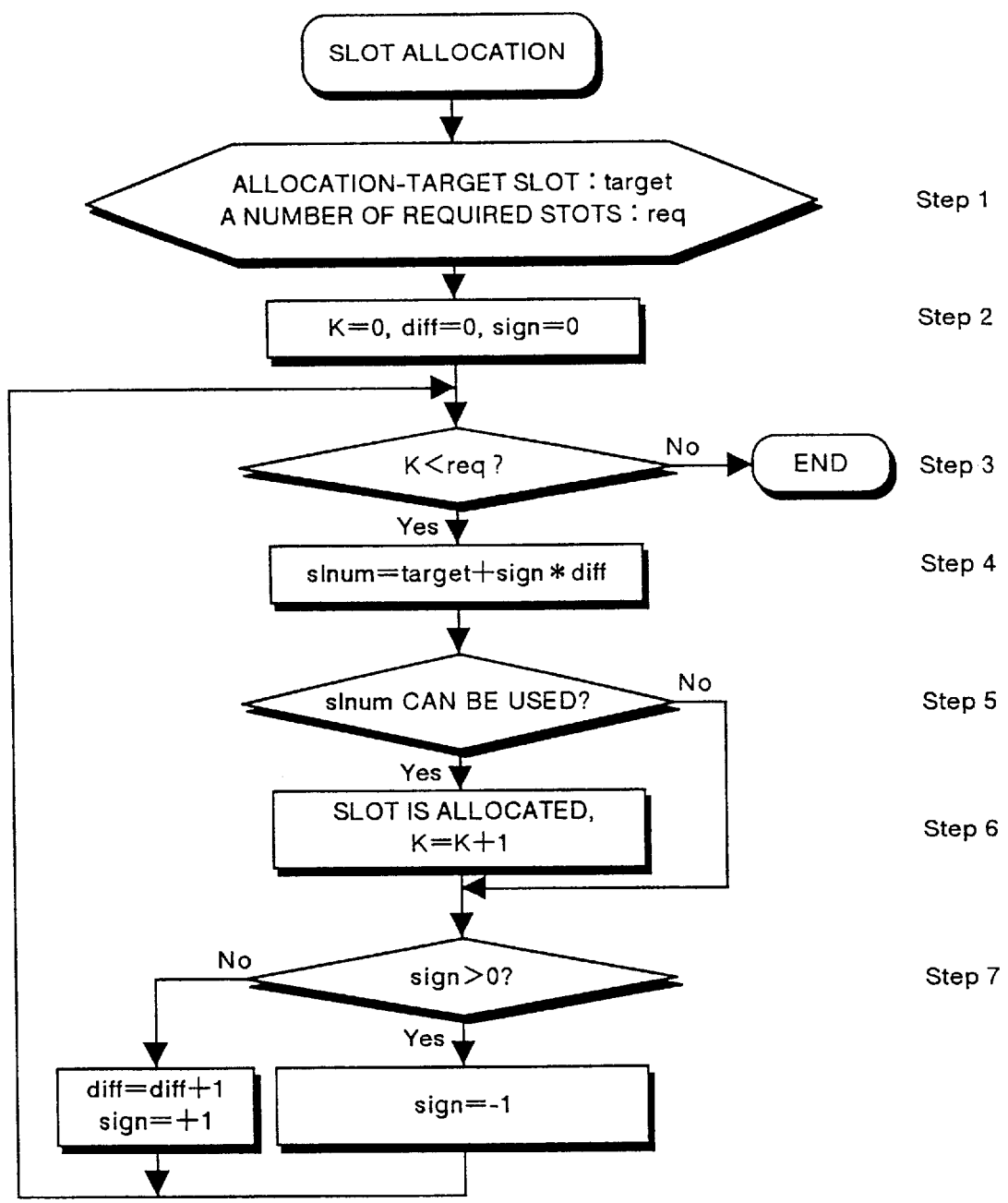
FIG. 11 is a flowchart of a method of deciding slots to be allocated around an allocation-target slot in a flow chart.

Next, description is made for a method of deciding slots to be allocated around the allocation-target slot shown in FIG. 9B with reference to the flow chart shown in FIG. 11. In Step 1, an allocation-target slot (target) and a number of slots required for allocation (req) are obtained. In Step 2, a number of slots having been allocated (K), a displacement value from the target slot (diff), and a sign of the displacement (sign) are initialized. In Step 3, it is determined that the processing described below is executed only when the number of slots having been allocated (K) is smaller that the number of required slots (req). In Step 4, an allocation-candidate slot number (slnum) is obtained. In Step 5, it is determined whether the slnum can be used or not. In Step 6, the processing for allocating the allocation-candidate slot number (slnum) is performed and the number of slots having been allocated (K) is incremented. In Step 7, when a sign of the displacement (sign) is 0 or negative, the sign is set to positive and the displacement value (diff) is incremented, and when the sign of the displacement is positive, the sign is set to negative. Through the processing as described above, slots can be allocated around the allocated slot. As some other method, there is also considered a method of preparing a priority table where high priority is set to an allocated slot as well as to slots around the allocated slot and determining whether the slots can be used or not in order of the high priority. It should be noted that, it is determined whether each slot can be used or not by using data such as a slot allocated situation and a situation of interference.

As Embodiment 4 has configuration described above, directions of antennas at the same timing orient in different directions among base stations each having a different directivity segregation number. Namely, interference can be reduced between adjacent base stations that use the same frequency. Further, as the interference distance can be made longer, the aperture area of the antenna in a base station can be made smaller and the height of the antenna in a base station can be lowered, which is useful for cost and mountability of the antenna.

Figure 12A:
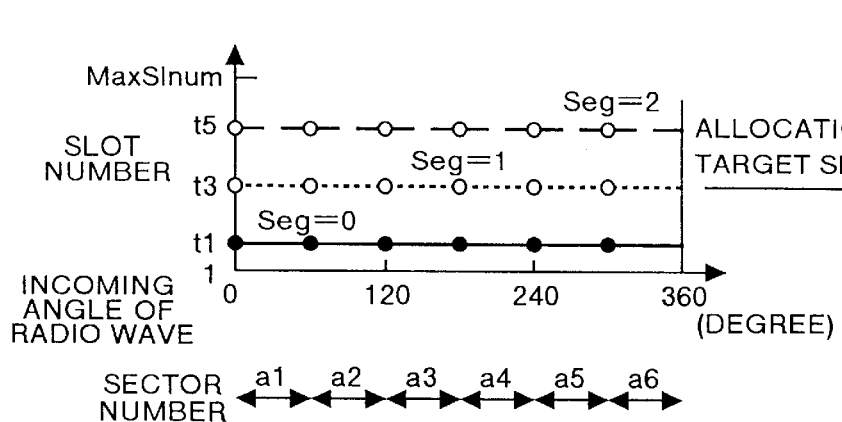
FIG. 12A and FIG. 12B are views showing a method of selecting slots to be allocated according to Embodiment 5.
Figure 12B:
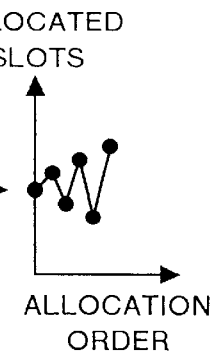

FIG. 12A and FIG. 12B show a method of selecting slots to be allocated according to Embodiment 5. Similarly to Embodiment 4, each base station selects a directivity segregation number and obtains a sector number from incoming angles of electronic waves. The difference is only in the correlation between sector numbers as well as segregation numbers to allocation-target slots.

In this embodiment, different target slots to be allocated are correlated to segregation numbers from each other without using sector numbers for this correlation. Namely, the segregation number of Seg=0 is correlated to the slot t1, the segregation number of Seg=1 is correlated to the slot t3, and the segregation number of Seg=2 is correlated to the slot t5. Through the correlation described above, the slots to be used can be separated by segregation numbers, therefore, interference can be reduced between base stations each having a different segregation number.

However, if a number of slots requested for allocation is larger than ⅓ of the whole number of slots, separation of slots to be used by segregation numbers is impossible, therefore, this embodiment is applicable only to a case where there is a sufficiently smaller amount of communications per base station.

As this embodiment has configuration described above, interference can be reduced among adjacent base stations using the same frequency with a simple method without obtaining a sector number.

Figure 13A:
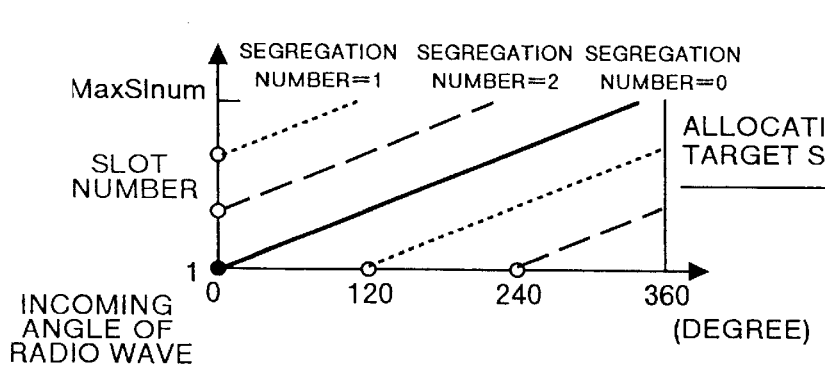
FIG. 13A and FIG. 13B are views showing a method of selecting slots to be allocated according to Embodiment 6.
Figure 13B:
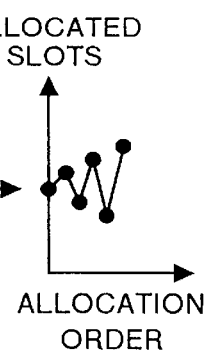
Figure 14:
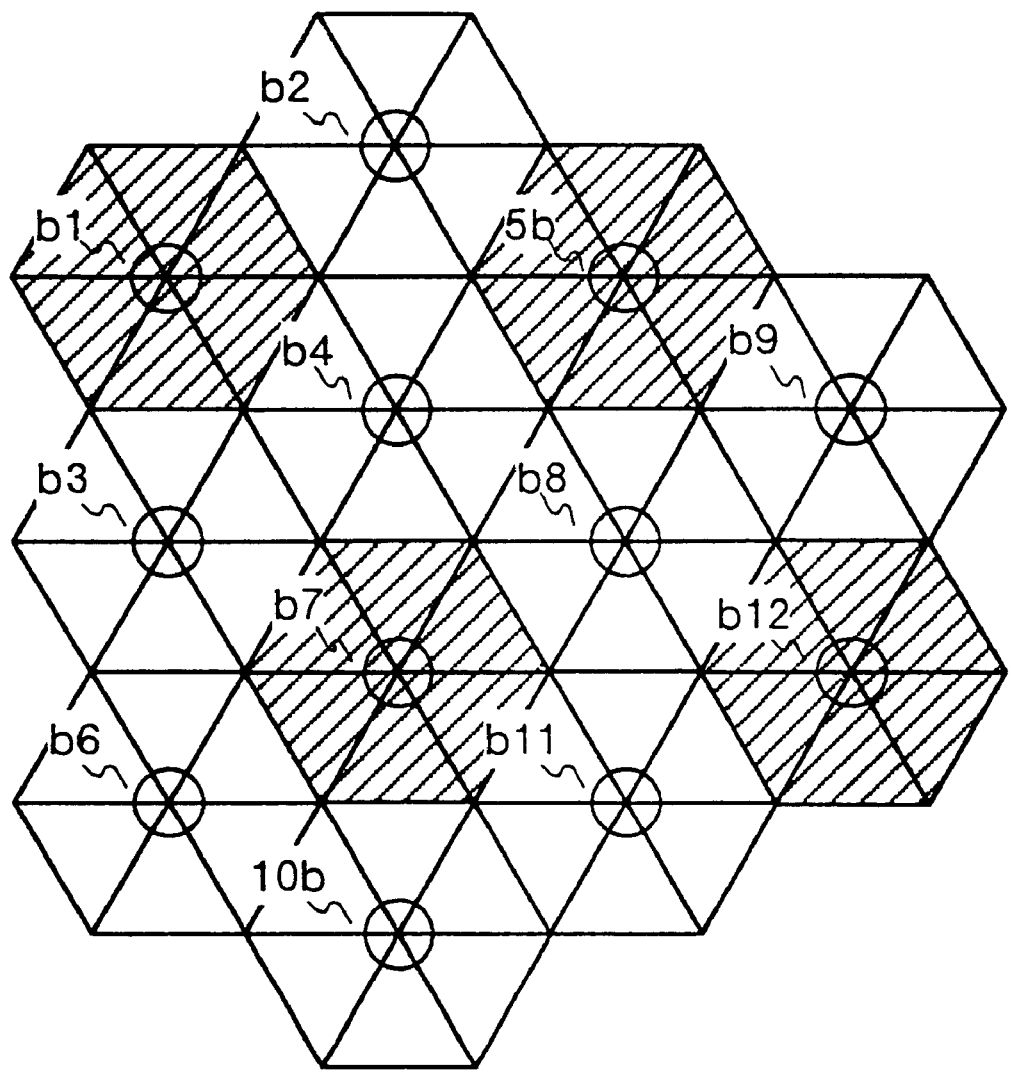
FIG. 14 shows a cellar structure based on the conventional technology.
Figure 19:
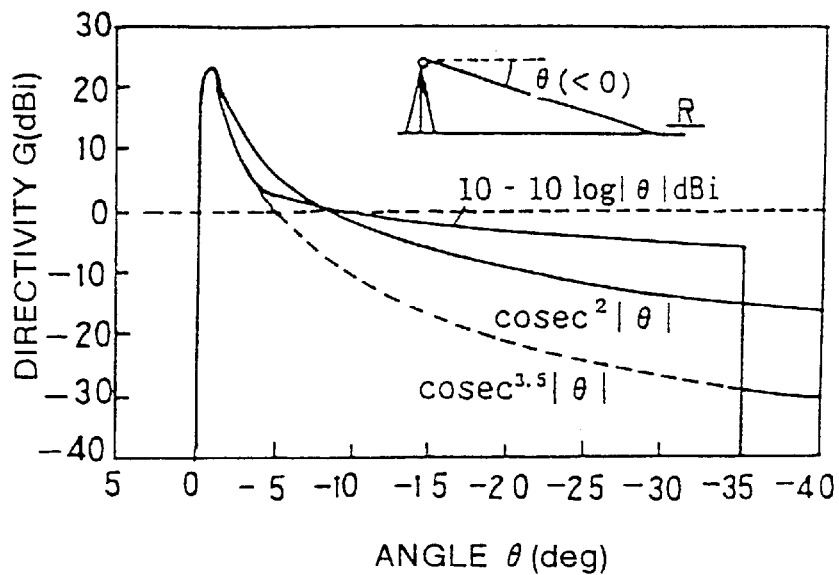
FIG. 19 is a view showing directivity within the perpendicular of an antenna having a directional pattern correlated to each form of a service area.
Figure 20A:
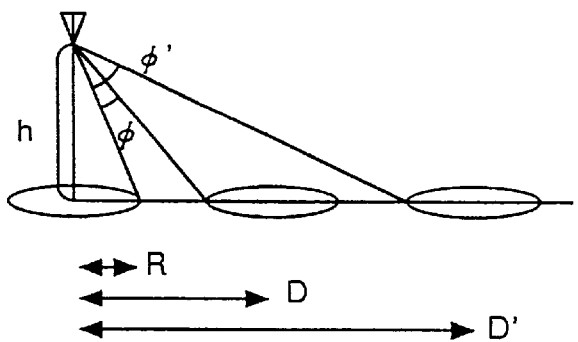
FIG. 20A and FIG. 20B show a relation between the interference distance, height of an antenna, and required attenuation angle.
Figure 20B:
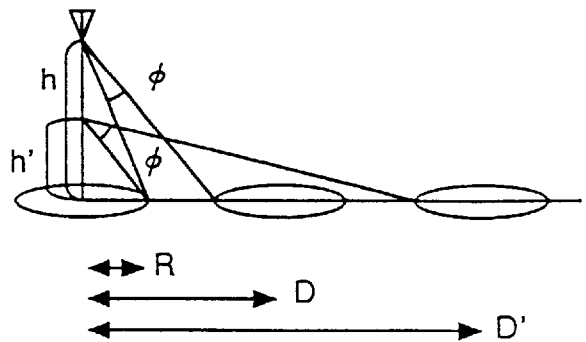

FIG. 13A and FIG. 13B show a method of selecting slots to be allocated according to Embodiment 6. Similarly to Embodiment 4, it is assumed that frames in base stations are synchronized to each other, each of the adjacent base stations using the same frequency selects a different directivity segregation number, and each of the remote base stations repeatedly selects the same directivity segregation number. In this embodiment, it is assumed that a base station can obtain incoming angles of radio waves. For the purpose of obtaining the angle, for example, the base station may actually measure an incoming direction of a radio wave or may obtain the angle through computation by using a position of coordinate values of a terminal station.

The horizontal axis of FIG. 13A shows incoming angles of radio waves, and the vertical axis thereof shows slot numbers. The solid line indicates base stations with the directivity segregation number of 0, the dotted line indicates base stations with the directivity segregation number of 1, and the dashed line indicates base stations with the directivity segregation number of 2, which correlates a combination between an incoming angle of a radio wave and a directivity segregation number to an allocation-target slot. Namely, if an incoming angle of a radio wave and a segregation number are decided, an allocation-target slot can uniquely be decided. It should be noted that, this correlation is decided so that an incoming angle of a radio wave and a sector number are correlated to allocation-target slots different from each other. FIG. 13B shows a method of deciding slots to be allocated around an allocation-target slot, which is the same as FIG. 9B according to Embodiment 4.

As Embodiment 6 has configuration described above, directions of antennas at the same timing orient different directions among base stations each having a different directivity segregation number. Namely, interference can be reduced between adjacent base stations that use the same frequency. Further, as the interference distance can be made longer, the aperture area of the antenna in a base station can be made smaller and the height of the antenna in a base station can be lowered, which is useful for cost and mountability of the antenna.

As the present invention has such configuration as described above, effects described below can be obtained.

In allocation of a slot in a base station having a directional antenna, the base station holds patterns of antenna directions and allocates a pattern different from that in each of adjacent base stations having the same frequency to a terminal station, so that the interference in the same frequency can be reduced without requiring complicated controls.

Even when the traffic is concentrated in a certain antenna direction, calling loss can be avoided by allocating many slots each using the direction.

A direction-determining pattern or a directivity segregation number used for allocation of a communication line can be selected automatically according to segregation of broadcasting channels.

Among base stations each having a different directivity segregation number, directions of antennas at the same timing can be changed to directions different from each other, therefore, interference can be reduced between adjacent base stations using the same frequency.

As the interference distance can be made longer, the aperture area of the antenna in a base station can be made smaller, which is useful when the cost of the antenna is considered.

As the interference distance can be made longer, the height of the antenna in a base station can be lowered, which is useful when the mountability of the antenna is considered.

This application is based on Japanese patent applications No. HEI 10-150902 and No. HEI 10-312113 filed in the Japanese Patent Office on Jun. 1, 1998 and Nov. 2, 1998, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio communication system with a directional antenna provided in each base station and a means for setting a direction of the antenna for each communication slot, said radio communication system repeatedly using radio waves at the same frequency;

where a plurality of direction-determining patterns are prepared in each base station; a base station selects a first direction-determining pattern among the plurality of direction-determining patterns; each base station adjacent to said base station selects a direction-determining pattern different from said first direction-determining pattern;

each remote base station repeatedly uses said first direction-determining pattern, whereby the adjacent base stations avoid using the same antenna direction at the same time; and a base station has a means for selecting a directivity segregation number as a natural number smaller than the number of directivity segregation, each of base stations adjacent to the base station has a means for selecting a directivity segregation number different from the first directivity segregation number, and each of remote base stations can repeatedly select the first directivity segregation number.

2. A radio communication system according to claim 1;

wherein each of said direction-determining patterns has a correlation between a period obtained by equally dividing a frame for a communication line by a number of direction-determining patterns and each antenna direction, and a base station has a means for dynamically selecting one among said direction-determining patterns as well as a means for determining an antenna directions used for communications with a terminal station and allocates a communication slot used for communications with a terminal station determined as one using a particular antenna direction from slots included in the period correlated by the direction-determining pattern.

3. A radio communication system according to claim 1;

wherein each of said direction-determining patterns has a correlation between a timing obtained by equally dividing a frame for a communication line by a number of direction-determining patterns and each antenna direction, and a base station has a means for dynamically selecting one among said direction-determining patterns as well as a means for determining an antenna direction used for communications with a terminal station and allocates a communication slot used for communications with a terminal station determined as one using a particular antenna direction from slots each having a timing adjacent to said timing correlated by the direction-determining pattern.

4. A radio communication system according to claim 1;

wherein said base station has a plurality of broadcasting channels for broadcasting common information to terminal stations, and said base station avoids, by dynamically selecting a broadcasting channel different from those of adjacent base stations, interference from the adjacent base stations to the broadcasting channel of said base station, and by setting a number of broadcasting channels to be the same as the number of direction-determining patterns, said base station dynamically selects one among the direction-determining patterns correlated to the dynamically selected broadcasting channel.

5. A radio communication system with a directional antenna provided in each base station and a means for setting a direction of the antenna for each communication slot, said radio communication system repeatedly using radio waves at the same frequency; wherein a number of directivity segregation is set to an integer more than 2, and a base station has a means for selecting a directivity segregation number as a natural number smaller than the number of directivity segregation, each of base stations adjacent to the base station has a means for selecting a directivity segregation number different from the first directivity segregation number, and each of remote base stations can repeatedly select the first directivity segregation number; and a base station has, for the purpose of allocating a communication slot to a terminal station, a means for obtaining sector numbers as natural numbers into which an angle of a radio wave to a terminal station is classified; a means for obtaining, by combining said sector number with the directivity segregation number of said base station, allocation-target slots different from each other; and a means for allocating slots to terminal stations around each of the allocation-target slots.

6. A radio communication system according to claim 5; wherein said base station has a plurality of broadcasting channels for broadcasting common information to terminal stations, and said base station avoids, by dynamically selecting a broadcasting channel different from those of adjacent base stations, interference from the adjacent base stations to the broadcasting channel of said base station, and by setting a number of broadcasting channels to be the same as the number of directivity segregation, said base station selects the directivity segregation number correlated to the dynamically selected broadcasting channel.

7. A radio communication system with a directional antenna provided in each base station and a means for setting a direction of the antenna for each communication slot, said radio communication system repeatedly using radio waves at the same frequency; wherein a number of directivity segregation is set to an integer more than 2, and said base station has a means for selecting a directivity segregation number as a natural number smaller than the number of directivity segregation, each of base stations adjacent to the base station has a means for selecting a directivity segregation number different from the first directivity segregation number, and each of remote base stations can repeatedly select the first directivity segregation number; and a base station has, for the purpose of allocating a communication slot to a terminal station, a means for obtaining allocation-target slots different from each other by combining an angle of a radio wave to a terminal station with a directivity segregation number of the base station; and a means for allocating slots to terminal stations around each of the allocation-target slots.

8. A radio communication system according to claim 7; wherein said base station has a plurality of broadcasting channels for broadcasting common information to terminal stations, and said base station avoids, by dynamically selecting a broadcasting channel different from those of adjacent base stations, interference from the adjacent base stations to the broadcasting channel of said base station, and by setting a number of broadcasting channels to be the same as the number of directivity segregation, said base station selects the directivity segregation number correlated to the dynamically selected broadcasting channel.

9. In a radio communication system having a directional antenna in each of a plurality of base stations, the each of the plurality of base stations communicating with a terminal station over a communication slot, a method for setting a direction of the directional antenna for the communication slot, the radio communication system repeatedly using radio waves of the same frequency, the method comprising:

selecting a first direction determining pattern from a plurality of direction determining patterns in a first base station, the plurality of direction determining patterns being prepared in each of the plurality of base stations;

selecting a different direction determining pattern from the first direction determining pattern in each of the plurality of base stations adjacent to the first base station;

selecting the first direction determining pattern for use in each non-adjacent remote base station of the plurality of base stations wherein the adjacent base stations avoid using the same antenna direction at the same time; and a base station has a means for selecting a directivity segregation number as a natural number smaller than the number of directivity segregation, each of base stations adjacent to the base station has a means for selecting a directivity segregation number different from the first directivity segregation number, and each of remote base stations can repeatedly select the first directivity segregation number.

10. The method according to claim 9, further including the steps of:

establishing a correlation between a period obtained by equaling dividing a communication frame by a number of the plurality of direction determining patterns and the direction of the directional antenna;

selecting one of the plurality of direction determining patterns;

determining an antenna direction used for communication with a terminal station; and allocating a communication slot for communicating with the terminal station from a plurality of communication slots included in the period, which correlates to the determined antenna direction.

11. The method according to claim 9, further including the steps of:

establishing a correlation between a timing obtained by equaling dividing a communication frame by a number of the plurality of direction determining patterns and the direction of the directional antenna;

selecting one of the plurality of direction determining patterns;

determining an antenna direction used for communication with a terminal station; and allocating a communication slot for communicating with the terminal station from a plurality of communication slots included in the timing, which correlates to the determined antenna direction.

12. The method according to claim 9, further including the steps of:

broadcasting common information to terminal stations over a plurality of broadcasting channels associated with each of the plurality of base stations;

selecting a broadcasting channel different from one or more broadcasting channels associated with the adjacent base stations to avoid interference;

setting a number of broadcasting channels to be the same as the number of direction determining patterns; and selecting one of the plurality of direction determining patterns correlated to the selected broadcasting channel.

13. In a radio communication system having a directional antenna in each of a plurality of base stations, the each of the plurality of base stations communicating with a terminal station over a communication slot, a method for setting a direction of the directional antenna for the communication slot, the radio communication system repeatedly using radio waves of the same frequency, the method comprising:

setting, in the radio communication system, a directivity segregation to an integer more than two;

selecting, in a first base station, a first directivity segregation number as a natural number smaller than the number of directivity segregation;

selecting in adjacent base stations, a second directivity segregation number different from the first directivity segregation number; and repeatedly selecting in the remote base stations the first directivity segregation number, wherein one or more of the base stations is further configured to:

obtain sector numbers as natural numbers into which an angle of a radio wave to a terminal station is classified;

obtaining allocation target slots different from each other by combining the obtained sector numbers with the directivity segregation number of the base station; and allocating slots to terminal stations around each of the allocation target slots.

14. The method according to claim 13, further including the steps of:

broadcasting common information to terminal stations over a plurality of broadcasting channel;

selecting a broadcasting channel different from those of adjacent base stations to avoid interference from adjacent base stations;

setting a number of broadcasting channels to be the same as the number of directivity segregation;

selecting the directivity segregation number correlated to the selected broadcasting channel.

15. In a radio communication system having a directional antenna in each of a plurality of base stations, the each of the plurality of base stations communicating with a terminal station over a communication slot, a method for setting a direction of the directional antenna for the communication slot, the radio communication system repeatedly using radio waves of the same frequency, the method comprising:

setting, in the radio communication system, a directivity segregation to an integer more than two;

selecting, in a first base station, a first directivity segregation number as a natural number smaller than the number of directivity segregation;

selecting, in adjacent base stations, a second directivity segregation number different from the first directivity segregation number; and repeatedly selecting in the remote base stations the first directivity segregation number, wherein one or more of the base stations is further configured to:

obtain allocation target slots as natural numbers into which an angle of a radio wave to a terminal station is classified;

obtaining allocation target slots different from each other by combining the obtained allocation target slots with the directivity segregation number of the base station; and allocating slots to terminal stations around each of the allocation target slots.

16. The method according to claim 15, further including the steps of:

broadcasting common information to terminal stations over a plurality of broadcasting channel;

selecting a broadcasting channel different from those of adjacent base stations to avoid interference from adjacent base stations;

setting a number of broadcasting channels to be the same as the number of directivity segregation; and selecting the directivity segregation number correlated to the selected broadcasting channel.

* * * * *